No. 772,646. Patented October 18, 1904.

UNITED STATES PATENT OFFICE.

GEORG EBERT, OF RIXDORF, NEAR BERLIN, GERMANY, ASSIGNOR TO RUDOLF PIESBERGEN, OF BERLIN, GERMANY.

MANUFACTURE OF AN ARTIFICIAL LEATHER SUBSTITUTE.

SPECIFICATION forming part of Letters Patent No. 772,646, dated October 18, 1904.

Application filed August 1, 1904. Serial No. 219,108. (No specimens.)

*To all whom it may concern:*

Be it known that I, GEORG EBERT, a subject of the King of Saxony, and a resident of Rixdorf, near Berlin, in the Empire of Germany, have invented new and useful Improvements in the Manufacture of Artificial Leather Substitutes, of which the following is a clear and full specification.

This invention relates to an improved artificial leather and its method of manufacture; and it consists, substantially, in a substance which sets and becomes hard on cooling, being coated and inclosed on all sides while still in a plastic condition with an envelop consisting of a thin collodion skin, the product thus made being finally subjected to a moderate pressure. Not only may the appearance, structure, and color of natural leather be given to the product in this manner, so that it is the equivalent of leather made by the ordinary tanning process in all its applications, but it has the great advantage in use over the latter of being perfectly impervious to weather, as it is in no way affected by water, damp, and changes of temperature.

Attempts have already been frequently made to produce an artificial substitute for leather, tanned gelatin and also nitrocellulose solutions being employed by themselves for this object. All products thus produced, however, can in no way claim to compare with natural leather, as they either have no strength or do not permanently resist the action of water and damp. This is particularly shown when the so-called "artificial leather" is treated in thin skins. If such skins are treated with water for some time—for instance, by placing them from twelve to twenty-four hours in water and then allowing them to dry—they curl up and become useless. This drawback is found with all the hitherto-known kinds of artificial leather, so that it has found very little application in industries. Now it has been found that a closely-fitting envelop consisting of a collodion skin round the plastic layer, according to the present invention, entirely avoids the above-mentioned drawback, assuming that the necessary precautions be taken in forming this collodion skin. The latter completely incloses the interior layer and combines so thoroughly with the intermediate layer that any injury to the skin is entirely avoided.

This improved process is carried out in practice in the following manner: Animal albumen, more particularly so-called "skin" gelatin, is allowed to soak in cold water and then dissolved in hot water. Glycerin, fatty oils, (castor-oil, olive-oil, or even saponified poppy-seed oil,) and concentrated india-rubber solution, and a filling substance, such as barium-white, are added to this hot solution, and the mass is thoroughly stirred until an intimate and uniform mixture of the substances has taken place. A solution of pyroxylin, dyed, if desired, is then spread on a smooth ground-glass plate, so that on cooling a thin skin of collodion is formed. This skin is then allowed to thoroughly dry and become solid, and then a uniform layer of the gelatin mass made in the manner hereinbefore described is conveyed in a warm condition onto the skin, and then this mass is allowed to slowly cool. A uniform layer is thus formed of a material which assumes a plastic condition before completely setting and which may be kneaded and rolled out by gentle pressure. When this gelatin mass has cooled, but is still in a plastic condition, the surface is carefully freed from surplus water by mopping with a soft cloth. Another solution of the same pyroxylin compound as was first employed is then formed on this gelatin layer, so that when the solution has cooled and evaporated a skin of collodion is formed over the gelatin layer, the latter being thus inclosed on all sides by a collodion skin. When the gelatin skin has obtained a suitable strength and toughness by standing for several hours, the entire mass is removed from the glass plate, which may be done without difficulty, whereupon the mass is subjected to a gentle pressure between soft cloths, so that it assumes the grain of natural leather. In this manner the plates are also rolled to a suitable thickness, the collodin skin inclosing the gelatin mass being at the same time thoroughly combined with the inner layer. It is therefore essential that the pressing and rolling of the plates should take place at a stage at which the internal gelatin layer has not yet become quite hard, as otherwise the plates cannot be rolled to the desired extent. The sheets or plates thus formed are finally immersed into a tanning solution in order to impart the necessary hardness and durability to the gelatin. This is done by immersing the plates or sheets in a solution of formaldehyde, chrome-alum, or tannic acid and allowing them to remain a long time therein. Formaldehyde, chrome-alum, tannic acid, and the like may, however, be added to the gelatin mass made in the manner hereinbefore described before it is poured onto the glass plate bearing the collodin skin, as these substances, as is well known, have the property of coagulating the albumen in the gelatin, thus in most cases saving the subsequent treatment of the rolled plates with tanning substances.

Having now particularly described and ascertained the nature of my said invention and in what manner the same is to be performed, I declare that what I claim is—

1. A method of making artificial leather, consisting in inclosing on all sides with a skin of collodion a substance which becomes hard when cold, while still in a plastic condition and thoroughly combining the whole by a gentle pressure with the object of rendering the substances thus made, resistant to moisture and changes of temperature. substantially as set forth.

2. An improved article of manufacture adapted to be employed as artificial leather consisting of a plastic substance which becomes hard when cold and is substantially composed of tanned animal albumen, glycerin, fatty oils, india-rubber solution and filling material and incased on all sides with a collodion skin, substantially as described.

In witness whereof I have hereunto set my hand in presence of two witnesses.

GEORG EBERT.

Witnesses:
 WOLDEMAR HAUPT,
 HENRY HASPER.